United States Patent [19]
Lund et al.

[11] Patent Number: 5,202,743
[45] Date of Patent: Apr. 13, 1993

[54] LONG RANGE LASER RANGING DEVICE

[75] Inventors: Glenn Lund, Peillon; Hervé Renault, Cannes, both of, France

[73] Assignee: Societe Nationale Industrielle et Aerospatiale, Paris, France

[21] Appl. No.: 854,723

[22] Filed: Mar. 23, 1992

[30] Foreign Application Priority Data

Mar. 28, 1991 [FR] France .................. 91 03795

[51] Int. Cl.$^5$ .................................. G01C 3/08
[52] U.S. Cl. .............................. 356/5; 356/152
[58] Field of Search ........................ 356/5, 152, 4

[56] References Cited

U.S. PATENT DOCUMENTS

| | | |
|---|---|---|
| 3,833,285 | 3/1974 | Heenan . |
| 4,373,808 | 2/1983 | Pell et al. .............. 356/152 |
| 4,964,722 | 10/1990 | Schumacher ............ 356/152 |

OTHER PUBLICATIONS

La Recherche Spatiale, vol. 10, No. 5, Sep. 1971, pp. 15–18.

*Primary Examiner*—Mark Hellner
*Attorney, Agent, or Firm*—Remy J. VanOphem

[57] ABSTRACT

A high speed laser ranging device composed of a transmitter/receiver unit and a target including a retroreflector adapted to receive a laser pulse (Ii) transmitted by the unit and to return it parallel to itself. This transmitter/receiver unit travels, with respect to the target, along a relative path with an overall relative velocity V, and normal to an instantaneous line joining it to the target, with a transverse relative velocity $v_t$ which, on average, is of the order of at least 1 km/sec. The retroreflector has a cube corner shape with three reflecting plane faces, two of which are normal to the third one, and forming between each other a dihedral angle ($7_1$) referred to as the "corrected dihedral angle", differing from 90° by a deviation value $\epsilon$ at least equal to one arcsecond. The "corrected dihedral angle" is contained within a plane (P) passing through the axis (n) of the cube corner and is at least approximately normal to the average orientation of the transverse relative velocity V within the field of view (C) of the cube corner and the deviation $\epsilon$ ranges between the minimum and maximum values of $v_t/(c. \sin \Theta)$, in radians, within this field of view, where $\Theta$ is the angle between the instantaneous line and the corrected dihedral angle, and where C is the speed of light.

10 Claims, 3 Drawing Sheets

LONG RANGE LASER RANGING DEVICE

BACKGROUND OF THE INVENTION

This invention deals with long range laser ranging, and more specifically, with the accurate measurement of the separation between two points very far removed one from the other. To this end, it is known to place a transmitter-receiver laser unit at one of these points and a retroreflector target at the other point. The distance measurement is derived from the time required for a laser pulse to travel in one direction and then in the reverse direction, between the transmitter-receiver and the target.

As an example, one may have to measure distances of several hundreds (or even thousands) of kilometers with an accuracy on the order of a few centimeters. Typically, the distance between a point on the Earth and an object in space (a space vehicle or a natural satellite (Moon) or an artificial satellite orbiting the Earth), or generally, between two space-borne bodies, such as a space vehicle orbiting another planet, and the like, may need to be measured. By accumulating such measurements and using several targets, for example, the distances between several points on the terrestrial globe may then be determined with high accuracy using triangulation or similar techniques.

In practice, the retroreflector target embodies one or several retroreflectors, which are preferably composed of three mutually contiguous and orthogonal plane reflector faces, and the diagonal of the imaginary cube to which this cube corner belongs is a reference axis referred to as the retroreflector normal. A property of such a retroreflector target is to reflect incident rays back parallel to themselves. Thus, reflecting the laser beam back to the transmitter, even over great distances, does not require pointing the cube corner axis towards the transmitter, provided that the laser pulse has penetrated the cube corner, and of course, that the orthogonality of the reflecting surfaces is as perfect as possible.

In fact, the pulse reflected by a perfect cube corner has only one diffraction lobe, with an energy peak in the reflection direction whose equivalent beam width can be given, as a first approximation, by the relation $\lambda/d$, where $\lambda$ is the wavelength of the incident pulse, and $d$ is the average transverse dimension of the target (improperly called the diameter). Thus, for a 0.5 $\mu$m wavelength (green in color) and a target diameter of 10 cm, the lobe width, (in the absence of any disturbing medium) is about one arcsecond. This width is actually the subtended angle through which an observer placed at the target location would see this reflected pulse.

As long as the subtended angle through which the target sees the separation between the transmitter (at the time when the incident pulse is transmitted) and the receiver (at the time when the reflected pulse reaches it) is smaller than the lobe width, the ranging principle indicated above may be advantageously employed.

However, the received energy to transmitted energy ratio of the transmitter/receiver unit decreases whenever there is a large relative velocity between this transmitter/receiver unit and the retroreflector target, transversal to the direction of a straight line which would join them. In this case, it is known to define a velocity aberration angle, which depends on the ratio between the transverse relative velocity and the laser beam velocity (or the velocity of light). When this velocity aberration angle becomes greater than the lobe width, this means that the receiver is transversally deviated from the diffraction lobe of the return pulse, when the latter reaches the location previously occupied by the transmitter/receiver unit at the instant of pulse emission.

To compensate for this velocity aberration, it has already been proposed to change by a few arcseconds the right angles between the three reflecting faces, so as to widen the return beam. However, in practice, when this modification angle is increased from zero, the diffraction lobe, which was originally unique in a three-dimensional graph correlating the energy density transmitted by the target in one direction with two tilt angles characterizing the spatial orientation of this direction relative to the incident pulse direction, widens by having in its center a null surrounded by a regular ring; specifically, this ring is formed of six peaks arranged into a circle and interpenetrating each other.

Within a given retroreflector, one thus obtains an "omnidirectional" correction of velocity aberration, which however becomes insufficient when the latter substantially exceeds the mean width of the six individual lobes, because any additional increase in these modification angles results in the breaking-up of the above-mentioned ring into six separate lobes. The compensation effect becomes uncertain according to whether or not the receiver intercepts one of the six lobes; moreover, when, by chance, the receiver does intercept one of the six lobes, the light energy is reduced as it amounts to only a sixth of the total energy.

It has thus been proposed to provide a target with a plurality of small retroreflectors oriented randomly about their normals so as to generate an overall return pulse formed of a plurality of unit pulses, the sets of six lobes of which would be mutually complementary and would form together a ring-like lobe. However, the provision of several retroreflectors contributing to the formation of this overall lobe adversely affects the ranging accuracy, by virtue of the differences in the position of those retroreflectors over the target which, in particular, induce a time-wise spreading of the pulse arrivals at the receiver, and of the small size of these retroreflectors, which limits the individual energy of these return pulses.

The purpose of this invention is to mitigate these drawbacks and, even for large transverse velocities, to ensure an efficient correction of velocity aberration and to obtain high accuracy measurements, while maintaining a high received light energy to transmitted energy ratio.

In order to do so, the invention abandons the symmetry principle satisfied up to now in the field of laser ranging, where the orientation of cube corners about their normals did not matter, and where the same requirements applied to the three dihedral angles.

SUMMARY OF THE INVENTION

The present invention proposes to generate a return pulse in a very small number of retroreflectors, designed and arranged so that the returned energy is then broken-up, not into six lobes, but into only two, which are aligned parallel to the transverse relative velocity.

More specifically, the invention proposes a long range laser ranging device composed of a transmitter/receiver unit, which is conventional per se, and which is adapted to transmit and receive a laser pulse, and a retroreflector target adapted to receive this laser pulse and return it parallel to itself. The transmitter/receiver unit travels with respect to the target along a relative path, in some points of which the unit has an overall relative velocity V and, normal to an instantaneous line joining it to the target, has a transverse relative velocity $v_t$, which, on the average, is of the order of at least 1 km/sec. The target has at least one cube corner shaped retroreflector, the field of view of which intersects the path in at least one portion thereof and which includes three reflecting plane faces which determine three dihedral angles converging towards an apex, of which two faces are normal to the third one while forming with each other an angle differing from 90° by a deviation value $\epsilon$ at least equal to one arcsecond. The faces converge into a so called "corrected dihedral angle" contained in a plane intersecting the cube corner normal and being at least approximately perpendicular to the mean orientation of the transverse relative velocity at this or these path portion(s), with the deviation $\epsilon$ ranging between the minimum and maximum values of the expression $v_t/(c. \sin \Theta)$, in radians, over the path portion(s) intercepted by the retroreflector field of view, where $v_t$ and $\Theta$ are, for a given point in this or these portion(s), the transverse relative velocity and the angle between the line joining this point to the target and the corrected dihedral angle, respectively, and where c is the speed of light.

In other words, when the relative path between the transmitter/receiver and the target is of an orbital nature (that is when the transmitter-receiver (conversely the target) travels along an orbit with respect to a celestial body—a planet such as the Earth or the Moon—carrying the target (conversely the transmitter-receiver)), plane P is at least approximately perpendicular to the planes defined by the orbital path portions intercepted by the field of view of the cube corner.

Usually, transverse velocities known today result in angular deviations in the range of about 1 to 10 arcseconds.

In a preferred embodiment, the target includes a plurality of such retroreflectors, designed and arranged as specified above, but having fields of view at least approximately separate, whereby only one retroreflector at a time is involved in the generation of the return pulse.

In fact, non-symmetrical cube corners already existed before this invention, but were applied to different technical fields and for functions other than those of this invention.

Cube corners fall into two categories presently known to the inventors.

Cubes with adjustable angles may be classified within the first category; examples of those are disclosed in U.S. Pat. Nos. 4,319,804 and 4,589,740. These documents provide an adjustment possibility for the reflected beam so as to orient it at will and align it, for example, with a receiver having a substantial angular deviation from the cube corners, relative to the transmitter (U.S. Pat. No. 4,589,540); it may also be desired to modulate the received signal strength with time (messages, coding, and the like—see U.S. Pat. No. 4,589,740), or also to compensate for environmental effects (temperature fluctuations (U.S. Pat. No. 4,319,804)). The transmitter and receiver are fixed relative to the target.

U.S. Pat. No. 3,936,194 deals with a method for checking and optimizing the adjustment of such adjustable cube corners.

Another category may include multiple cube corners for marking functions, such as road marking (signs, posts, "white lines"...), employing an array or mosaic of a large number of very small retroreflectors (sometimes provided as multiple corner indentations into a plastic sheet) to return an incident beam, which is typically that originating from vehicle headlamps, towards the driver. A permanent change in the orthogonality of angles (see U.S. Pat. No. 3,833,285 (change in one of the three dihedral angles of a minor proportion of corners in a mosaic of small retroreflectors), or U.S. Pat. No. 3,923,378), or providing striations on the corner faces (document U.S. Pat. No. 4,775,219), ensures that part of the returned beam is reflected towards the driver's eyes (and not only towards the headlamps). In this second category, if the transmitter-receiver unit moves relative to the retroreflectors, this motion has a very small transverse component.

However, none of the above documents contemplates cube corners showing an orthogonality deviation in only one of its angles for correcting any velocity aberration effect (which has been specified above as occurring significantly only at transverse relative velocities in excess of about 1 km/sec) by arranging these cube corners with such an orientation that a maximum retroreflected energy is concentrated in a given direction towards a unique remote receiver.

It should be appreciated that, according to this invention, the cube corner returns the beam with two diffraction lobes which are aligned substantially parallel to the transverse relative velocity and arranged symmetrically relative to the incident pulse direction, and does not require that the sign of this transverse relative velocity be taken into account. This is particularly advantageous, for example, in the case where the target and/or the transmitter/receiver are respectively placed on the Earth and on a space vehicle in a polar orbit, in which case the relative motion, due to the space vehicle's orbit, is aligned either in a substantially NORTH-SOUTH direction or in a substantially SOUTH-NORTH direction.

Specifically, the invention applies to the case of a satellite orbiting the Earth (or another planet) and where the retroreflector target is placed on the Earth, while the transmitter/receiver is on board a satellite. This allows, by increasing the number of targets on the Earth (targets are passive elements and thus in practice cheaper than active elements such as transmitters and receivers), a good terrestrial coverage to be obtained using a single satellite.

For the specific case of a polar orbit, though this may be extended to other kinds of orbits, when it is desired to have a large field of view for the retroreflector target, which would be greater than that of a single cube corner, the invention suggests that the target preferably includes a plurality of the above mentioned type of retroreflectors, with fields of view having little or no overlap.

Such nearly separate fields of view (see above) have the advantage of avoiding, for given satellite positions, transmitter/receiver reception of return pulses from several cube corners, with energies of about the same order of magnitude, which would mitigate the measurement accuracy, or require an increase in the complexity of the electronic processing system associated with the transmitter/receiver for a deconvolution of signals from the various cube corners. In practice, it is preferred to provide between one and two corners per steradian of a field of view to be covered by the target as a whole.

Advantageously, in the case of a multiple-retroreflector target, one of these retroreflectors is oriented so that its axis is parallel to the local vertical (aimed at zenith) around which the other retroreflectors are preferably arranged with a uniform angular distribution. Advantageously, the tilt angle of the axis of these cube corners relative to the axis of the main cube corner ranges from 40° to 65° (for example 45°-60°) and is preferably close to 50°. Preferably, the various lateral cube corners have the same tilt angle relative to the central cube corner.

According to a preferred target design, a central cube corner is surrounded by four regularly distributed lateral cube corners.

Preferably, these lateral cube corners are oriented according to a symmetrical configuration relative to the local mean direction of the ground projection of the orbit portions intercepted by the overall target field of view.

In the case of a polar orbit, these four cube corners are thus typically oriented, except when approaching polar circles, towards NORTH, SOUTH, EAST, and WEST, respectively, or according other symmetrical arrangement with respect to the NORTH-SOUTH direction, towards NORTH-EAST, NORTH-WEST, SOUTH-EAST and SOUTH-WEST, where the dihedral angle offsets from orthogonality, all define, with respect to the normals of the cube corners to which they belong, planes intercepting a local horizontal plane along directions at least approximately parallel to the EAST-WEST direction.

Objects, features and advantages of this invention will be more apparent from the ensuing detailed description of non limiting examples thereof, taken in conjunction the accompanying drawings.

DETAILED DESCRIPTION OF THE PREFERRED EMBODIMENT

Figure 1:
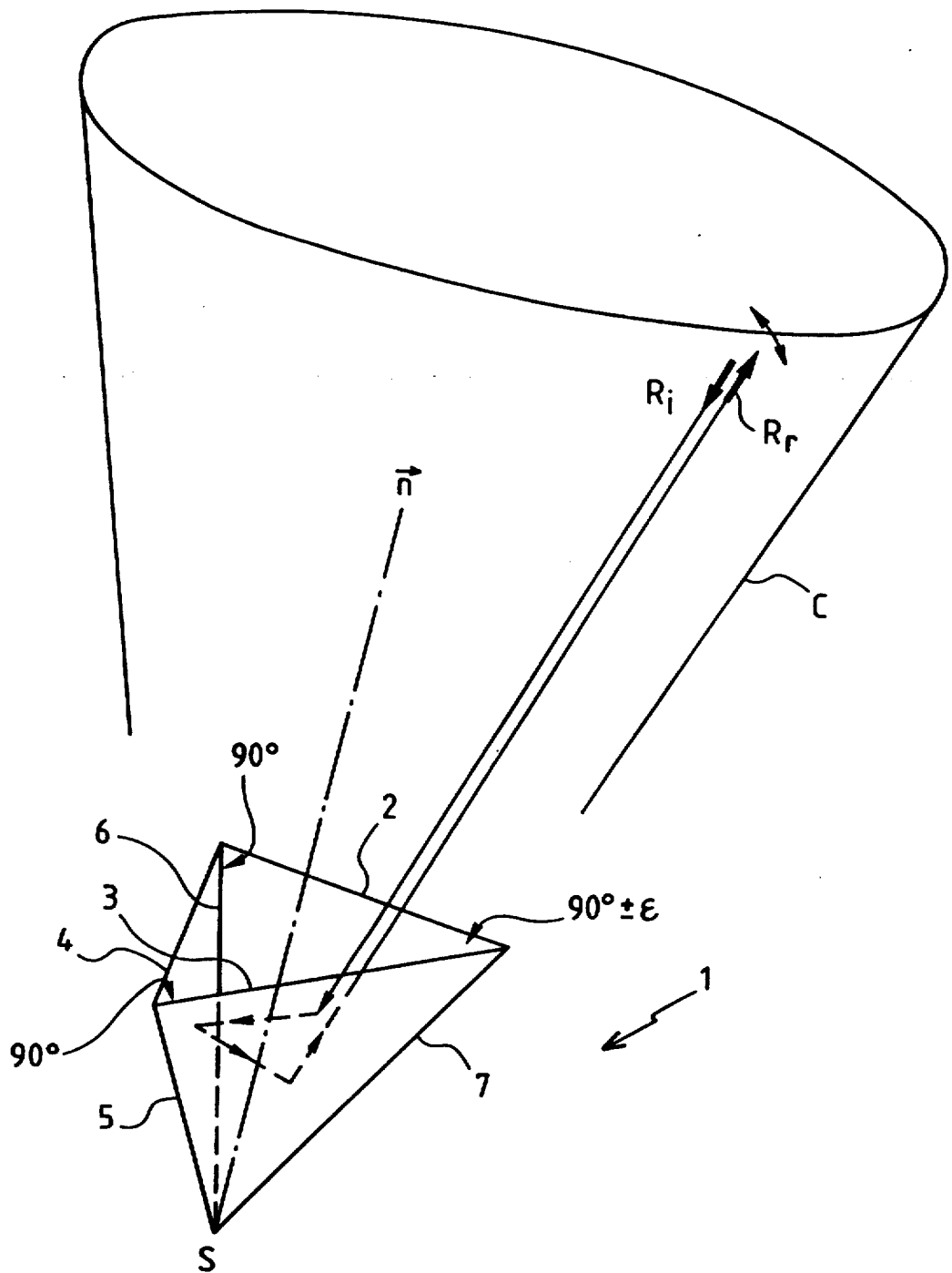
FIG. 1 is a perspective view of a cube corner according to the invention.

FIG. 1 shows a cube corner retroreflector 1 according to the invention. The retroreflector 1 includes three plane reflecting faces 2, 3 and 4 defining three dihedral angles 5, 6 and 7 converging into an apex S. Both faces 2 and 3 are orthogonal to the third face 4 while forming between each other an angle having a deviation $\epsilon$ relative to orthogonality, which is typically of the order of 1 to 10 arcseconds. The dihedral angle 7 is called the corrected dihedral angle.

Here, the cube corner retroreflector 1 is hollow but could be, according to an alternative, not shown, a portion of a cube of a bulk material transparent at the wavelength selected for laser pulses (see below).

The direction which forms, with all three dihedral angles 5 to 7, the same angle is called the normal n of the cube corner. The retroreflector field of view is approximately a cone with a half angle of 30°.

The average transverse dimension measured at the output of the reflector is called a diameter.

An incident ray Ri is returned after reflection at the three faces, as a return ray which is substantially parallel to the direction of incidence.

Figure 3:
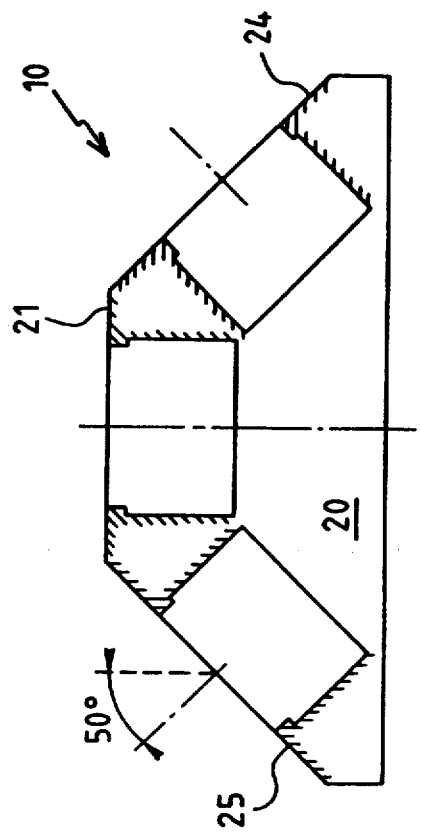
FIG. 3 is a side view.
Figure 2:
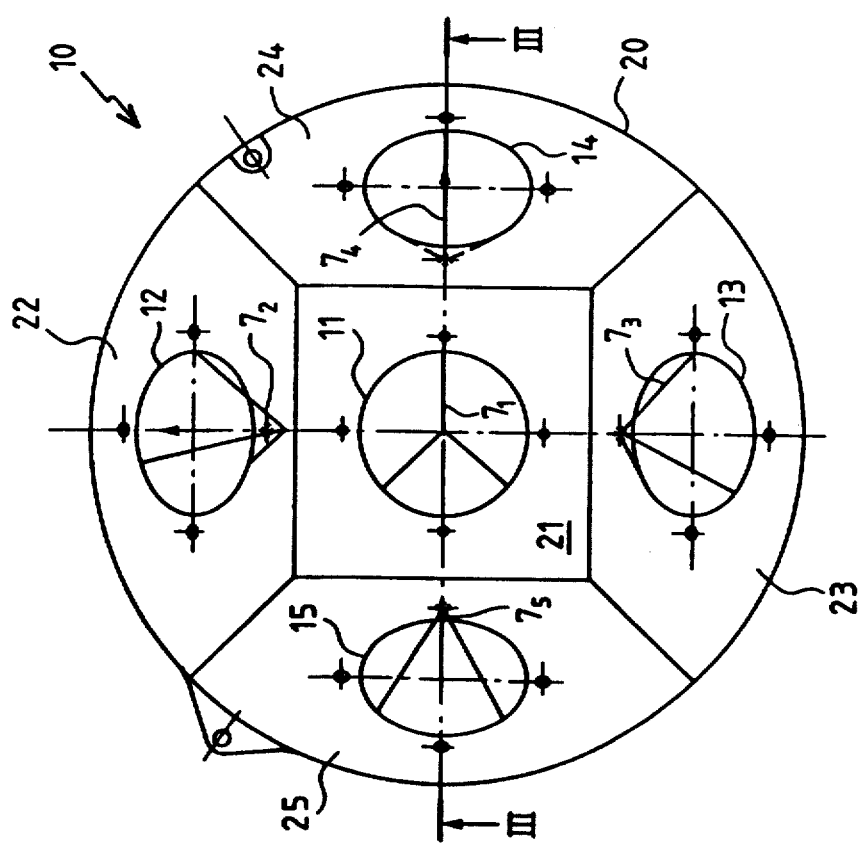
FIG. 2 is a top view of a retroreflector target with several retroreflectors according to FIG. 1.

FIGS. 2 and 3 show a retroreflector target 10 adapted to be located on the ground, with the orientation specified below. This target includes five retroreflectors 11 to 15 all similar to the cube corner retroreflector 1 of FIG. 1.

In this target 10 chosen to serve as an example, one of the retroreflectors 11 occupies a central position with its normal n parallel to the local vertical, while the four other retroreflectors 12 to 15 are distributed about the central retroreflector, here in a symmetrical manner having equal tilt angles with respect to the retroreflector normal, here equal to 50°.

The retroreflectors are positioned in a support structure 20 with a circular base having a horizontal upper face 21 for the central retroreflector as well as four faces 22 to 25, tilted at 50° for the lateral retroreflectors.

These retroreflectors are positioned so that their corrected dihedral angles $7_1$, $7_2$, $7_3$, $7_4$, and $7_5$ define, with the normals n of the cube corners to which they belong, planes intercepting a local horizontal plane along directions at least approximately parallel to a characteristic direction of the target.

The fields of view of these retroreflectors are substantially separate.

Figure 4:
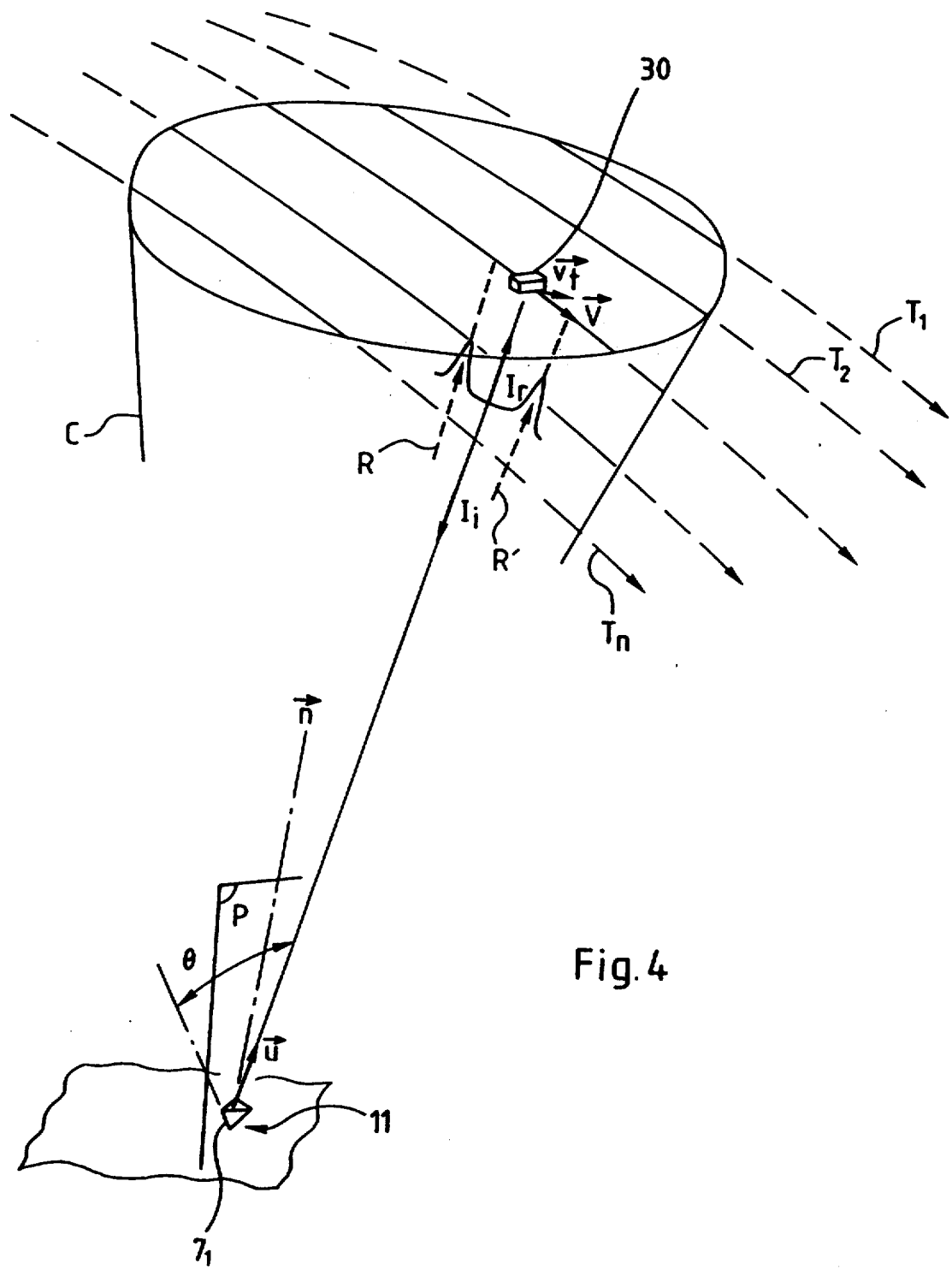
FIG. 4 is an explanatory view of the use of targets shown in FIG. 2 and 3, cooperating with a transmitter/receiver on board a satellite describing a polar orbit.

FIG. 4 shows a single retroreflector, which here, is the central retroreflector 11 of the target shown in FIGS. 2 and 3; its normal is denoted n and its field of view is schematically shown as a cone C.

This field of view intercepts the trajectory of a transmitter-receiver unit 30 at several portions $T_1, T_2, \ldots T_n$. The average respective velocities for these portions are approximately parallel. These portions are in fact the intersections of the field of view with successive orbits of a satellite carrying the transmitter-receiver unit 30 with a velocity $v_t$ measured transversally to line 11-30, of at least about 1 km/sec.

The transmitter-receiver unit is of any known appropriate type. It is adapted to transmit a laser pulse $I_i$ towards a target and to receive a pulse $I_R$ returned by the target.

The retroreflector is placed so that the plane P defined by the corrected dihedral angle and normal n, is substantially normal to the average orientation of the transmitter/receiver transverse velocity over these path portions (typically within a few degrees).

The value of the angular deviation $\epsilon$ associated with this corrected dihedral angle typically lies between the minimum and maximum values assumed by the expression $v_t/(c. \sin \Theta)$, in radians, for various values of path portions, where $v_t$ is the associated transverse relative velocity, $\Theta$ is the corresponding angle between direction 11-30 and the corrected dihedral angle, and c is the speed of light.

Due to the presence of a non zero deviation $\epsilon$, the return pulse has an energy maximum along two directions R and R' slightly shifted symmetrically on both sides of the direction of pulse $I_i$, at least approximately parallel to the path. In fact, these offsets, which are typically of the order of a few arcseconds, have been exaggerated in FIG. 4 for clarity.

Due to the high transverse velocity $v_t$, the transmitter-receiver unit 30 has substantially deviated from the direction of pulse $I_1$ when pulse $I_R$ returns. The value of $\epsilon$, when it is chosen between the above mentioned minimum and maximum values, implies that one of the maximum energy directions R and R' intercepts the transmitter-receiver so that the latter receives significant energy in spite of its transverse velocity.

In fact, the orientation of the retroreflector about its normal and the value of $\epsilon$ are chosen so as to optimize the energy received for various directions from which a transmitter-receiver is likely to transmit a pulse towards the retroreflector. The above specified conditions take into account the fact that, typically, these transmission positions are homogeneously distributed within the field of view.

It should be appreciated that it is the relative velocity between both objects defined by the target and the transmitter-receiver, along a direction normal to the line that joins them together, which contributes to the angular velocity aberration. The quantity to be considered is therefore generally the projection of a velocity in a given direction, this projection being a function of the geometry of both of the above mentioned objects at the considered time. Thus, a satellite moving along a geostationary orbit observed at zenith by an observer on the Earth would have a maximum velocity angular aberration of 4.1 arcseconds. If the observer is elsewhere on the Earth, so that his viewing line forms an angle relative to the satellite nadir, the apparent velocity aberration will be less than 4.1 arcseconds.

Thus, for a given scenario, the apparent velocity aberration varies according to variations in the line of sight. The projection of this velocity onto a reference plane located at the observer's level, occurs in a direction which also varies according to variations in the line of sight.

Assuming that the observer is a retroreflector whose function is to take into account these different velocity aberration vectors, it has been found that, for a reasonable field of view (a cone with a half angle of $\sim 20°$-30°), the set of vectors to be considered shows little dispersion. It is then reasonable, as shown above, to apply a single compensation, for the field of view in question, so as to obtain an optimized correction of the observed velocity.

With respect to the prior art implying an omnidirectional solution, this approach allows for an optimum concentration of retroreflected energy in a privileged direction, that corresponding to the optimization for a given retroreflector field of view.

It should however be noted that the velocity aberration field to be corrected may, in the case of a "polar" orbit, comprise two different sets of optima for the orientation and aperture of corrected dihedral angles, corresponding to "ascending" and "descending" satellite passes which are performed in two directions arranged symmetrically on both sides of the fictitious "NORTH-SOUTH" direction. In this case, the retroreflectors may be optimized for only one of these directions, or a trade-off may be found to optimize the average velocity aberration effects between both directions.

For all practical cases implying a space vehicle or the Moon orbiting the Earth, the deviation angle $\epsilon$ will lie in the range $0.8'' \leq \epsilon \leq 8''$.

The angle $\delta$ of faces for the other dihedral angles should fall, approximately, in the range $90° \pm 1''$. In the case of a Moon retroreflector, with $\epsilon \approx 0.8''$, these angles should rather be selected within the range $-0.2\epsilon \leq (\delta - 90°) \leq +0.7\epsilon$.

To check these angles, one may use interferometry: the retroreflected wave is caused to interfere with a reference wave which gives rise to three sets of fringes, the separations and inclinations of which are indicative of the introduced direction deviations. The accuracies reached are of the order of a few tenths of arcseconds, according to the retroreflector diameter and interferometer quality.

Various configuration examples according to the invention are given below:
Polar satellite orbiting the Earth:
relative velocity $\sim 5$ to 8 km/sec
angular velocity aberration: 6.9" to 11" arc
orthogonality error on one of the faces: 4.2" to 6.8"
ground-based target(s) with retroreflectors
Geostationary satellite orbiting the Earth:
relative velocity 3 km/sec
angular velocity aberration 4.1" arc
orthogonality error of one of the faces: 2.5"
ground-based target(s) with retroreflectors
Moon-Earth:
relative velocity 1 km/sec
angular velocity aberration: 1.4" arc
orthogonality error of one of the faces: 0.8"
Satellite-Earth or planet:
relative velocity according to the orbit $>1$ km/sec
velocity aberration greater than 1.4" arc
orthogonality error of one of the faces exceeding 0.8"
Moon- or planet-based target(s) with retroreflectors.

Alternatively, in the above described examples, the target may instead be carried by the satellite, with one or several ground-based transmitter(s)—receiver(s) (sometimes called "laser stations"). More information on this kind of configuration may for example be found in the proceedings from the meetings of the "International Workshop on Laser Ranging Instrumentation".

Specifically, the invention may be implemented on a 3-axis stabilized satellite, such as the one referred to as ERS-1 (800 km altitude and 98° inclination). This satellite may then be provided with a cube corner such that plane P defined above is substantially orthogonal to the relative path of these ground-based laser stations relative to the satellite, that is, typically, normal to the orbit plane.

As for Earth-Moon laser ranging, it should be recalled that retroreflector panel placed on the Moon during the LUNAKHOD and APOLLO missions and that the invention could readily be employed for designing targets to be installed during future missions.

As a dimensioning example, the support structure for the target in FIGS. 2 and 3 has at its base a diameter of about 780 mm, a height of 300 mm, and recesses with diameters of about 90 mm (corresponding to the "diameter" of the retroreflectors).

While the present invention has been described in detail, it will be understood that various changes would occur to those skilled in the art without departing from the invention.

We claim:

1. A long range laser ranging device which includes a transmitter-receiver unit for transmitting a laser signal and receiving a reflected laser signal, and a retroreflector target for receiving said laser signal and returning said reflected laser signal to said transmitter-receiver unit in a direction substantially parallel to said laser signal, wherein said transmitter-receiver unit travels along a path at a relative velocity V to said retroreflector target, such that said transmitter-receiver unit has a transverse relative velocity which is substantially normal to an instantaneous line between said transmitter-receiver unit and said retroreflector target, wherein said retroreflector target comprises:

at least one retroreflector having a field of view which intersects at least a portion of said path of said transmitter-receiver unit, said at least one retroreflector having three reflecting planar faces defining three dihedral angles converging towards an apex, said at least one retroreflector having a normal which is equi-angled from said three dihedral angles, a first and second planar face of said three reflecting planar faces being substantially perpendicular to a third planar face of said three reflecting planar faces, said first and second planar faces defining a first dihedral angle therebetween which deviates from 90° by a deviation value $\epsilon$, said first dihedral angle defining a plane with said normal of said at least one retroreflector, said plane being approximately perpendicular to an average orientation of said transverse relative velocity;

wherein said deviation value $\epsilon$ is between minimum and maximum values, in radians, of the equation:

$$v_t/(c \sin \theta)$$

wherein $v_t$ is said transverse relative velocity, $\theta$ is an angle defined between said first dihedral angle and said instantaneous line between said transmitter-receiver unit and said retroreflector target, and c is the speed of light.

2. A long range laser ranging device according to claim 1, wherein said retroreflector target comprises a plurality of retroreflectors having substantially separate fields of view.

3. A long range laser ranging device according to claim 1, wherein said retroreflector target is located on the Earth, and said transmitter-receiver unit is carried by a satellite orbiting the Earth.

4. A long range laser ranging device according to claim 3, wherein said satellite travels along orbits which are at least approximately polar.

5. A long range laser ranging device according to claim 2, wherein said retroreflector target is located on the Earth and comprises a plurality of retroreflectors, a central retroreflector of said plurality of retroreflectors being oriented parallel to the vertical, and the remaining retroreflectors of said plurality of retroreflectors having an homogeneous angular distribution around said central retroreflector, and wherein said first dihedral angle of each of said plurality of retroreflectors defines, with a respective normal, a plane intercepting a local horizontal plane, so as to define a plurality of parallel straight lines.

6. A long range laser ranging device according to claim 5, wherein said normals of said remaining retroreflectors each define a tilt angle of about 40° to about 65° relative to said normal of said central retroreflector.

7. A long range laser ranging device according to claim 6, wherein said tilt angles are substantially equal.

8. A long range laser ranging device according to claim 6, wherein said tilt angles are about 45° to about 50°.

9. A long range laser ranging device according to claim 5, wherein there are four of said remaining retroreflectors.

10. A long range laser ranging device according to claim 5, wherein said transmitter-receiver unit travels along polar orbits, and wherein said plurality of retroreflectors are oriented to be substantially symmetrical about an average local direction of a ground projection of said at least a portion of said path intercepted by said field of view of said retroreflector target.

* * * * *

UNITED STATES PATENT AND TRADEMARK OFFICE
CERTIFICATE OF CORRECTION

PATENT NO. : 5,202,743
DATED : April 13, 1993
INVENTOR(S) : Lund et al

It is certified that error appears in the above-identified patent and that said Letters Patent is hereby corrected as shown below:

```
Abstract, line 16, delete "(n)" and insert ---- (n) ----.

Column 5, line 24 after "according" insert ---- to ----.

Column 5, line 36, after "conjunction" insert ---- with ----.

Column 5, line 63, delete "n" and insert ---- n ----.

Column 6, line 11, delete "n" and insert ---- n ----.

Column 6, line 22, delete "n" and insert ---- n ----.

Column 6, line 30, delete "n" and insert ---- n ----.

Column 6, line 45, delete "n" and insert ---- n ----.

Column 8, line 43, delete "panel" and insert ---- panels ----.
```

Signed and Sealed this

Eighteenth Day of January, 1994

Attest:

BRUCE LEHMAN

Attesting Officer     Commissioner of Patents and Trademarks